(12) United States Patent
Shepherd et al.

(10) Patent No.: US 6,286,858 B1
(45) Date of Patent: Sep. 11, 2001

(54) ENERGY ABSORBING AIR BAG MODULE

(75) Inventors: Jeffrey Alan Shepherd; Mark Thomas Winters, both of Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/363,064

(22) Filed: Jul. 29, 1999

(51) Int. Cl.[7] .................................................. B60R 21/20
(52) U.S. Cl. ...................................... 280/728.2; 280/732
(58) Field of Search ........................... 280/728.2, 728.1, 280/731, 732

(56) References Cited

U.S. PATENT DOCUMENTS

| | | | |
|---|---|---|---|
| 5,730,459 | * 3/1998 | Kanda | 280/728.2 |
| 5,762,359 | * 6/1998 | Webber et al. | 280/728.2 |
| 5,813,692 | * 9/1998 | Faigle et al. | 280/728.2 |
| 5,826,901 | * 10/1998 | Adomeit | 280/728.2 |

* cited by examiner

Primary Examiner—Eric Culbreth
(74) Attorney, Agent, or Firm—Kathryn A. Marra

(57) ABSTRACT

An energy absorbing air bag module includes a housing and a mounting member integral with the housing for attaching the housing to a structural portion of the vehicle. The energy absorbing air bag module also includes an energy absorbing mechanism integral with the mounting member, wherein the energy absorbing mechanism deforms when a contact force strikes the energy absorbing air bag module to absorb energy and move away from the contact force.

19 Claims, 3 Drawing Sheets

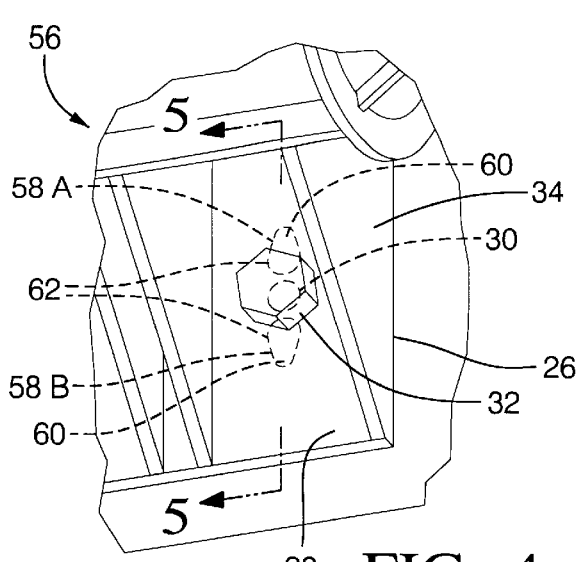
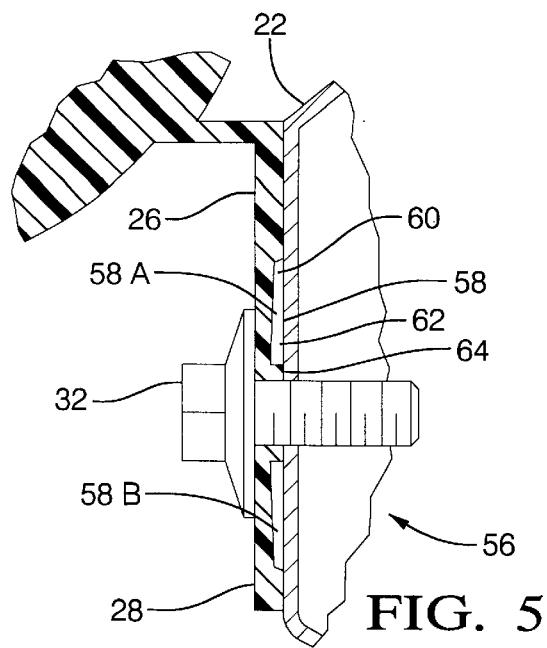
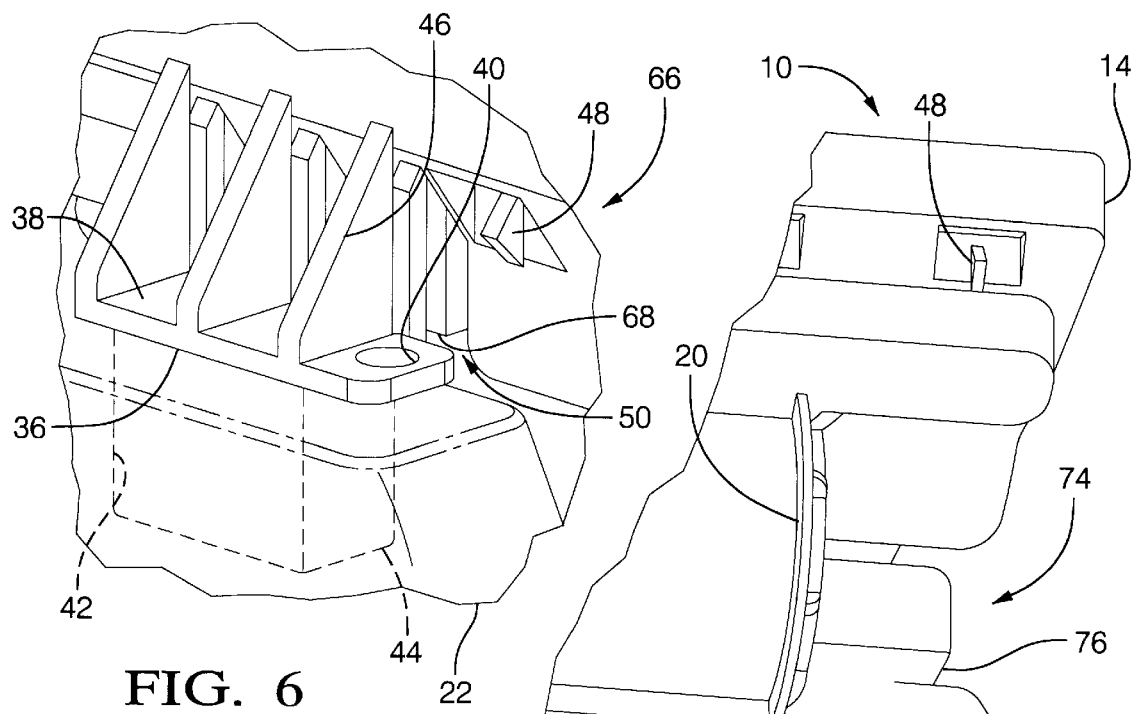
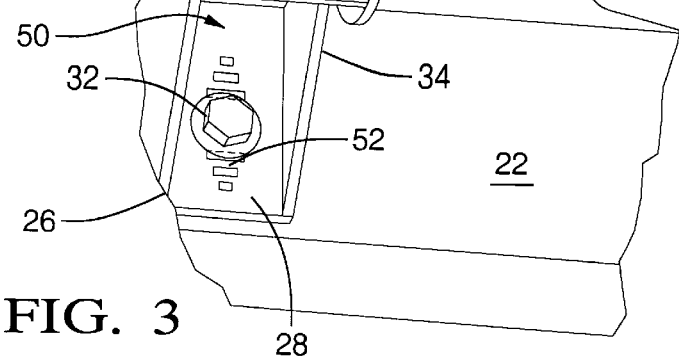

ENERGY ABSORBING AIR BAG MODULE

TECHNICAL FIELD

The present invention relates generally to inflatable restraint systems for vehicles and, more particularly, to an energy absorbing air bag module for an air bag system on a vehicle.

BACKGROUND OF THE INVENTION

It is known to provide an inflatable restraint system in a vehicle, to augment protection traditionally afforded vehicle occupants through the use of seat belts. In some vehicles, the inflatable restraint system may be an air bag system disposed within an occupant compartment in the vehicle in close proximity to either a driver occupant or one or more passenger occupants. Typically, the air bag system includes an air bag module attached to vehicle structure, with an air bag disposed within the air bag module. The air bag is deployed through an opening in a cover portion of the air bag module to extend in an occupant compartment of the vehicle upon the occurrence of a predetermined condition. An example of a predetermined condition is a force of minimum magnitude and from a particular direction that is applied to the vehicle, such as an applied force resulting from an impact of an object. The air bag is deployed as a result of the occurrence of the predetermined condition, and restrains movement of the occupant to help protect the occupant during a collision.

It is desirable to help provide additional protection for an unrestrained occupant in a vehicle, regardless of whether the applied force meets the predetermined condition to deploy the air bag. Thus, there is a need in the art to provide an air bag module having an energy absorbing mechanism to help reduce any potential contact force realized by an unrestrained occupant striking the air bag module.

SUMMARY OF THE INVENTION

It is, therefore, one object of the present invention to provide an energy absorbing air bag module for an air bag system on a vehicle.

It is another object of the present invention to provide an energy absorbing air bag module for an air bag system on a vehicle, that has an energy absorbing mechanism to reduce a contact force realized by an occupant striking the air bag module, regardless of whether the applied force satisfies a predetermined condition to deploy the air bag.

To achieve the foregoing objects, the present invention is an energy absorbing air bag module for an air bag system on a vehicle. The air bag module includes a housing and a mounting member integral with the housing for attaching the housing to a structural portion of the vehicle. The energy absorbing air bag module also includes an energy absorbing mechanism integral with the mounting member, wherein the energy absorbing mechanism deforms when a contact force strikes the energy absorbing air bag module to absorb energy and move away from the contact force.

One advantage of the present invention is that an improved energy absorbing air bag module is provided for a vehicle. Another advantage of the present invention is that the energy absorbing air bag module includes a housing and an energy absorbing mechanism that allows the housing to deflect when an object strikes the air bag module. Yet another advantage of the present invention is that the energy absorbing air bag module can break away in a controlled manner, so that another portion of the vehicle can absorb the energy from an object striking the air bag module, regardless of whether a predetermined condition is right for the air bag to deploy. Still another advantage of the present invention is that the energy absorbing mechanism does not affect deployment of an air bag of the energy absorbing air bag module if the predetermined condition is right to deploy the air bag.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 3 is a front perspective view of an energy absorbing mechanism, according to the present invention, of the energy absorbing air bag module of FIG. 1.

FIG. 4 is a view similar to FIG. 3 illustrating another embodiment, according to the present invention, of the energy absorbing mechanism.

FIG. 5 is a sectional view taken along line 5—5 of FIG. 4.

FIG. 6 is a perspective view of still another embodiment, according to the present invention, of the energy absorbing mechanism for the energy absorbing air bag module of FIG. 2.

DESCRIPTION OF THE PREFERRED EMBODIMENT

Figure 1:
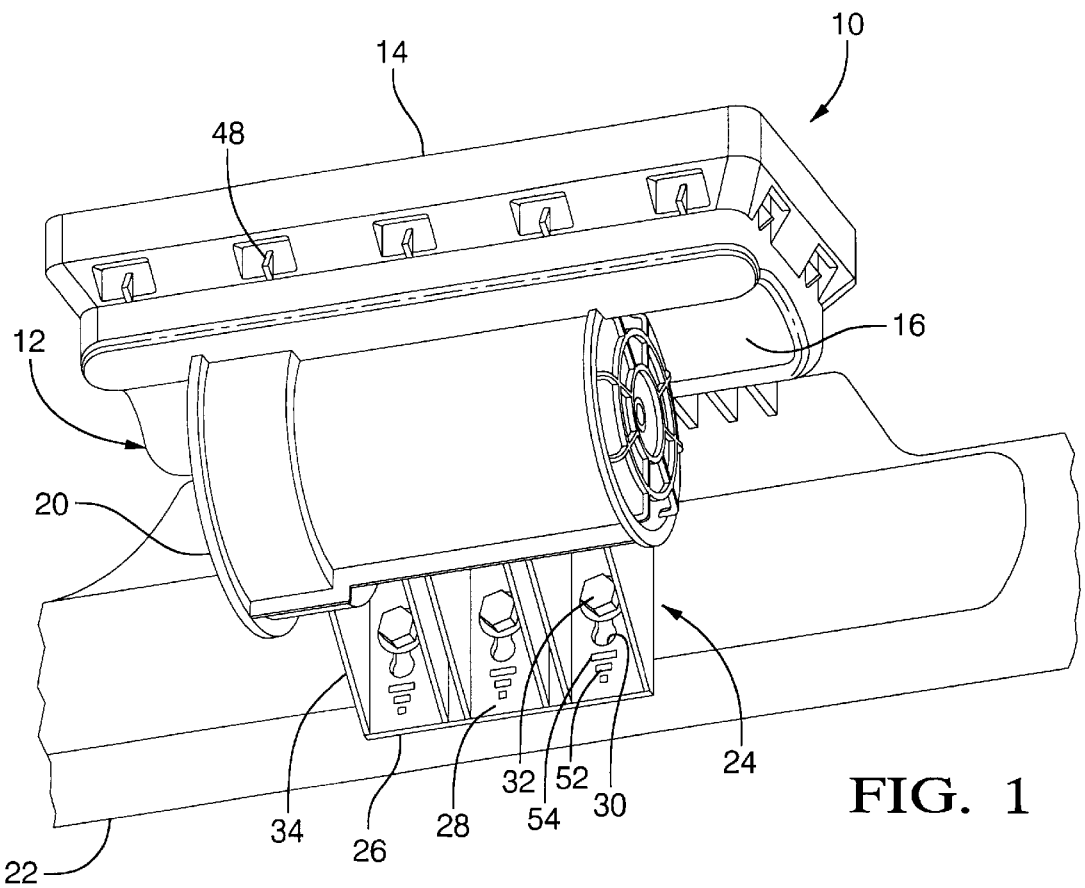
FIG. 1 is a front perspective view of an energy absorbing air bag module, according to the present invention, illustrated in operational relationship with an instrument panel support beam.
Figure 2:
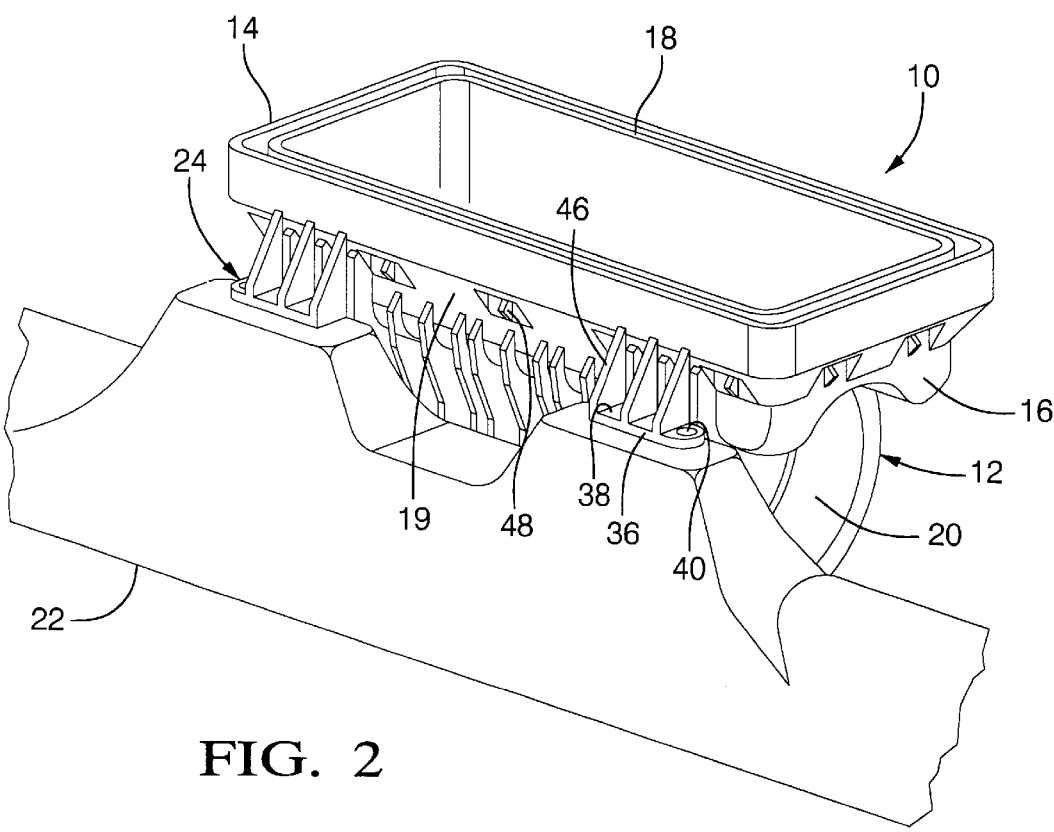
FIG. 2 is a rear perspective view of the energy absorbing air bag module of FIG. 1.

Referring to the drawings and in particular FIGS. 1 and 2, one embodiment of an energy absorbing air bag module 10, according to the present invention, is shown for an air bag system (not shown) mounted in a vehicle (not shown), in a manner to be described. It should be appreciated that the vehicle and air bag system are conventional and known in the art.

Referring to FIGS. 1 through 3, the energy absorbing air bag module 10 includes a housing, generally indicated at 12, for housing components of the air bag system. The housing 12 includes an air bag receptacle 14 for housing an air bag (not shown). As is known in the art, the air bag is designed to deploy and inflate between a portion of the vehicle and an occupant (not shown) upon the occurrence of a predetermined condition. In this embodiment, the predetermined condition is an applied force of minimum magnitude directed towards a front portion of the vehicle and the air bag system is a passenger side air bag system for a passenger occupant seated in the vehicle. If the predetermined condition is not met, the air bag will not deploy. However, an unrestrained occupant may potentially move around in an occupant compartment of the vehicle and directly or indirectly strike the energy absorbing air bag module 10 with a contact force due to the applied force.

The air bag receptacle 14 is generally rectangular in shape and has at least one centrally located inflator aperture (not shown) in a bottom portion 16 of the air bag receptacle 14. A top portion 18 of the air bag receptacle 14 includes a removable cover or deployment door (not shown) to enclose the air bag receptacle 14 while the air bag is stored therein. It should be appreciated that the cover may be decorative in appearance.

The housing 12 also includes a gas generator or inflator receptacle 20. The inflator receptacle 20 is positioned beneath the bottom portion 16 of the air bag receptacle 14, such that at least one inflator aperture is in communication with the inflator receptacle 20. The inflator receptacle 20 is cylindrically shaped and houses an inflator (not shown) that is used to direct an inflating fluid, such as nitrogen gas, into the air bag to thereby inflate the air bag upon the occurrence of the predetermined condition, previously described. The inflator is connected by wires (not shown) to a source of power (not shown) for activating the inflator. It should be appreciated that the inflator is activated by the source of power to expel the gas.

The energy absorbing air bag module 10 is mounted to a portion of vehicle structure, which in this embodiment, is an instrument panel support beam 22 of the vehicle. It should be appreciated that the instrument panel support beam 22 provides structural rigidity to an instrument panel (not shown), and an attachment surface for the energy absorbing air bag module 10.

The energy absorbing air bag module 10 includes a mounting member, generally indicated at 24, for attaching the housing 12 of the energy absorbing air bag module 12 to the instrument panel support beam 22. In this embodiment, the mounting member 24 includes a first mounting member 26 and a second mounting member 36. The first mounting member 26 is of a rigid mounting type and has a first planar portion 28 extending radially from the inflator receptacle 20. The first planar portion 28 is generally rectangular in shape and includes a plurality of apertures 30 spaced axially along the first planar portion 28 for receiving a fastener 32 to attach the housing 12 of the energy absorbing air bag module 10 to the instrument panel support beam 22. In this embodiment, the first mounting member 26 includes three apertures 30.

The first mounting member 26 also includes a plurality of support ribs 34 spaced axially along the first planar portion 28. The support ribs 34 are generally triangularly shaped and extend between the inflator receptacle 20 and the first planar portion 28. It should be appreciated that the number, width and spacing of the support ribs 34 can be chosen to enhance the structural integrity of the attachment of the housing 12 of the energy absorbing air bag module 10 to the instrument panel support beam 22.

As shown in FIGS. 2 and 6, the second mounting member 36 is of the "hang-in" type, to prevent rotational movement of the housing 12 of the energy absorbing air bag module 10 when secured to the instrument panel support beam 22. The second mounting member 36 has a generally planar central portion 38 extending radially from a side portion 19 of the air bag receptacle 14. The second mounting member 36 is secured to the instrument panel support beam 22 by a suitable attaching means, such as a fastener (not shown). The central portion 38 includes an aperture 40 and the fastener is disposed therein to secure the second mounting member 36 to the instrument panel support beam 22.

The second mounting member 36 also includes a leg 42 extending downwardly a sufficient amount from the central portion 38. The leg 42 is retained within a leg receiving recess 44 in the instrument panel support beam 22. Preferably, the leg 42 is generally rectangular so as to be rigidly retained within the leg receiving recess 44 in the instrument panel support beam 22.

The second mounting member 36 also includes a plurality of support ribs 46 extending between the side portion 19 of the air bag receptacle 14 and the central portion 38. Preferably, the support ribs 46 are generally triangular in shape and spaced axially along the central portion 38. It should be appreciated that the number, spacing and thickness of the support ribs 46 can be chosen to enhance the structural integrity of the housing 12 of the energy absorbing air bag module 10 when secured to the instrument panel support beam 22. In this embodiment, two second mounting members 36 are spaced axially along the side portion 19 of the air bag receptacle 14. It should be appreciated that the location, spacing, and number of second mounting members 36 are adjustable according to packaging and attachment criteria. It should be appreciated that the "hang-in" attachment of the second mounting member 36 reduces rotational movement of the housing 12 of the energy absorbing air bag module 10 resulting from normal driving forces.

Advantageously, the air bag receptacle 14, inflator receptacle 20, first mounting member 26 and second mounting member 36 are integral, unitary and formed as one-piece. An outer surface of the housing 12 of the energy absorbing air bag module 10 may include additional strengthening ribs 48 or the like, to enhance the structural integrity thereof. Preferably, the energy absorbing air bag module 10 is made from a low-ductile material such as nylon. It should also be appreciated that the energy absorbing air bag module 10 may house other components (not shown) to operatively deploy the air bag upon the occurrence of the predetermined condition.

In operation, the air bag is initially in a folded, stowed position within the air bag receptacle 14. When the vehicle experiences a predetermined condition, such as an applied force from another object of at least a minimum threshold level, the inflator is activated and a gas is expelled into the air bag. The deployment door is disengaged from the air bag receptacle 14 and the air bag deploys inboard into an occupant compartment of the vehicle between the occupant and a portion of the vehicle. However, if the applied force does not meet the predetermined condition the air bag will not deploy. An unrestrained occupant may potentially move around the occupant compartment and directly or indirectly impose a contact force towards a portion of the vehicle, such as the energy absorbing air bag module 10.

Advantageously, the energy absorbing air bag module 10 includes an energy absorbing mechanism 50, according to the present invention to absorb energy and move away, to potentially help to protect an unrestrained occupant contacting the energy absorbing air bag module 10. It is anticipated that the contact force is directed towards the energy absorbing air bag module 10 may be from the movement of an unrestrained occupant, such as a result of a vehicle impact where the applied force is less than a predetermined minimum to deploy the air bag.

As shown in FIGS. 1 and 3, the energy absorbing mechanism 50 includes a breakaway bar 52 that allows the energy absorbing air bag module 10 to absorb energy and move away from the contact force applied to the energy absorbing air bag module 10. The breakaway bar 52 is located in the first mounting member 26 near the aperture 30 for securing the first mounting member 26 to the instrument panel support beam 22. The breakaway bar 52 is generally rectangular and is adjacent to a generally rectangular slit 54 extending through the first mounting member 26. Preferably, three breakaway bars 52 are positioned both above and below the aperture 30 in the first mounting member 26.

In operation, a contact force, as previously described, on the energy absorbing air bag module 10 will cause the fastener 32 in the first mounting member 26 securing the energy absorbing air bag module 10 to the instrument panel support beam 22 to shear through the breakaway bars 52. Advantageously, the energy absorbing air bag module 10 will move away from the contact force and the energy is absorbed by the energy absorbing air bag module 10 and instrument panel support beam 22, to protect the unrestrained occupant. It should be appreciated that the number and dimensional characteristics of the breakaway bars 52, such as thickness and spacing between bars, can be chosen reflecting a predetermined level of contact force required before the fastener 32 in the aperture 30 will shear through the breakaway bars 52.

Advantageously, each breakaway bar 52 or slit 54 separating the breakaway bars 52 can have a different dimensional size or shape. For example, assuming an occupant's knee would impact a lower portion of the energy absorbing air bag module 10 and an occupant's head would impact an upper portion of the energy absorbing air bag module 10, the breakaway bars 52 below the aperture 30 may be larger than the breakaway bars 52 above the aperture 30.

Referring to FIGS. 4 and 5, another embodiment 56, according to the present invention, of an energy absorbing mechanism 50 for the energy absorbing air bag module 10 is illustrated. The energy absorbing mechanism 56 includes a tapered recess 58, which is positioned adjacent the aperture 30 in the first mounting member 26. The tapered recess 58 has a generally wedge shape, with a distal portion 60 that is progressively narrower and thinner in cross-sectional area than a proximate portion 62 the aperture 30. As such, the proximate portion 62 of the tapered recess 58 is wider and deeper than the distal portion 60 of the tapered recess 58. The first mounting member 26 includes a wall 64 separating the aperture 30 from the tapered recess 58. Advantageously, the tapered recess 58 provides a pathway for the fastener 32 to travel through when a contact force, as previously described, is applied to the energy absorbing air bag module 10.

It should be appreciated that the positioning and dimensional characteristics of the tapered recess 58 may be chosen to achieve break away. In this embodiment, there is an upper tapered recess 58a positioned above and a lower tapered recess 58b positioned below the aperture 30 in the first mounting member 26. Further, both tapered recesses 58a, 56b are positioned on one side of the first mounting member 26. It is anticipated that the contact force on the upper portion of the energy absorbing air bag module 10 will cause the fastener 32 holding the energy absorbing air bag module 10 in position to shear through the wall 64 and the upper tapered recess 58a. As the fastener 32 moves through the upper tapered recess 58a, the resistance to its continued movement will increase, thereby allowing the energy absorbing air bag module 10 to absorb energy from the contact force while moving away from it.

In a similar manner, a contact force on the lower portion of the energy absorbing air bag module 10 will cause the fastener 32 holding the energy absorbing air bag module 10 in position to shear through the upper wall 64 and the lower tapered recess 58b in a similar manner. The resultant movement of the energy absorbing air bag module 10 will allow the energy absorbing air bag module 10 to absorb energy from the contact force while moving away from it.

Advantageously, the lower tapered recess 58b may have different dimensional characteristics than the upper tapered recess 58a. For example, the proximate portion 62 of the lower tapered recess 58b may have less depth than the proximate portion 62 of the upper tapered recess 58a. Therefore, a larger contact force is required for the fastener 32 to travel through the lower tapered recess 58b than the upper tapered recess 58a.

Figure 7:
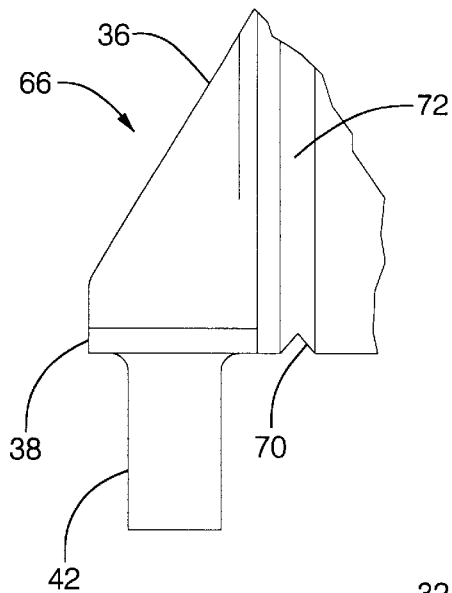
FIG. 7 is a side view of the energy absorbing mechanism of FIG. 6.

Referring to FIGS. 6 and 7, still another embodiment 66, according to the present invention, of the energy absorbing mechanism 50 is illustrated. In this embodiment, the energy absorbing air bag module includes a crack initiator 68 that produces a crack that propagates through the energy absorbing air bag module 10 upon the application of a contact force, as previously described, on the energy absorbing air bag module 10. In this embodiment, the crack initiator 68 is strategically positioned in the second mounting member 36. Therefore, the energy absorbing air bag module 10 can break away from its "hang-in" attachment to the instrument panel support beam 22, because the leg 42 of the second mounting member 36 could potentially limit the movement of the energy absorbing air bag module 10. The inclusion of a crack initiator 68 in the second mounting member 36, preferably near the leg 42, will initiate a crack (not shown) that propagates through the second mounting member 36 upon the application of a contact force on the energy absorbing air bag module 10. Advantageously, the energy absorbing air bag module 10 will move by breaking-away from its attachment to the instrument panel support beam 22, while absorbing energy from a potential contact force. It should be appreciated that the position and size of the crack initiator 68 could be optimized, so that the crack only occurs when the predetermined condition is not right to deploy the air bag.

The crack initiator 68 includes a notch 70 positioned on an edge of the central portion 38, and extending into a lower portion of the support rib 46. The crack initiator 68 also includes a thinned wall section 72 of material extending axially along the support rib 46. Preferably, the thinned wall section 72 is continuous with the notch 70.

The application of a contact force to the energy absorbing air bag module 10 from an object such as an occupant, creates a stress in the structural area surrounding the notch 70. The progressively increasing bending moment of a load on the energy absorbing air bag module 10 from the contact force propagates the crack through the second mounting member 36, and the resulting deformation causes the energy absorbing air bag module 10 to break-away from its attachment to the instrument panel support beam 22. Advantageously, the energy absorbing air bag module 10 will absorb some energy from the contact force while at the same time moving away from it.

Figure 9:
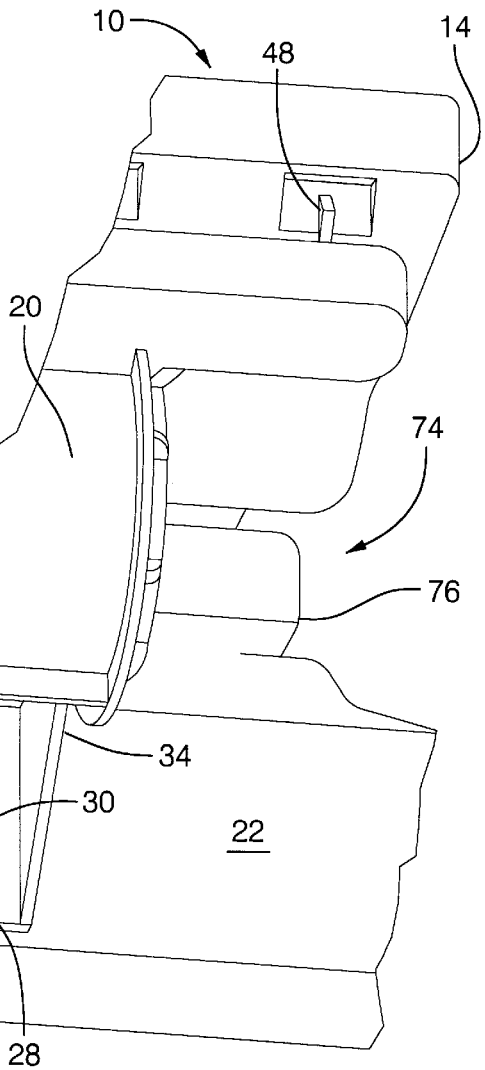
FIG. 9 is a view similar to FIG. 3, illustrating the energy absorbing mechanism of FIG. 4 and FIG. 8 after a contact force on the energy absorbing air bag module.
Figure 8:
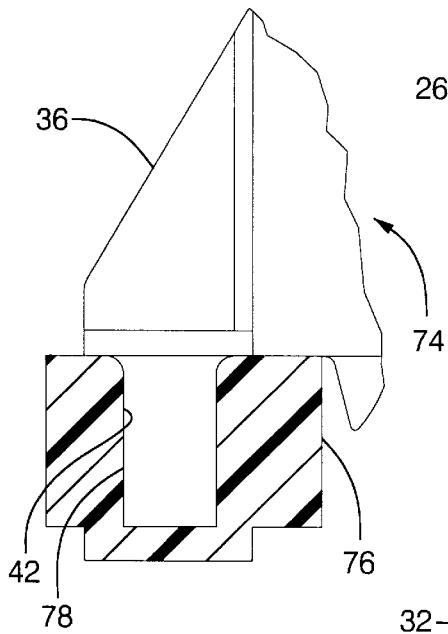
FIG. 8 is a view similar to FIG. 7 illustrating yet another embodiment, according to the present invention, of the energy absorbing mechanism.

Referring to FIGS. 8 and 9, still yet another embodiment 74, according to the present invention, of the energy absorbing mechanism 50 is illustrated. The energy absorbing air bag module 10 includes a vibration damper 76. The vibration damper 76 is a generally rectangular member made from an energy absorbing material that can be crushed, such as a high-density, rigid foam material. In this embodiment, the vibration damper 76 is positioned between the second mounting surface 36 and the instrument panel support beam 22. More specifically, the vibration damper 76 is approximately the same length as the central portion 38 and includes a recess 78 for receiving the leg 42. Preferably, the vibration damper 76 is molded to fit around the leg 42, and the combined leg 42 and vibration damper 76 fit into the leg receiving recess 44 in the instrument panel support beam 22. The vibration damper 76 is crushed upon the application of the contact force to the energy absorbing air bag module 10. The vibration damper 76 will absorb energy while allowing movement of the energy absorbing air bag module 10. It should be appreciated that the dimensional and material characteristics of the vibration damper 76 can be chosen to ensure that the vibration damper 76 produces a predetermined amount of energy absorption and movement of the energy absorbing air bag module 10.

Figure 10:
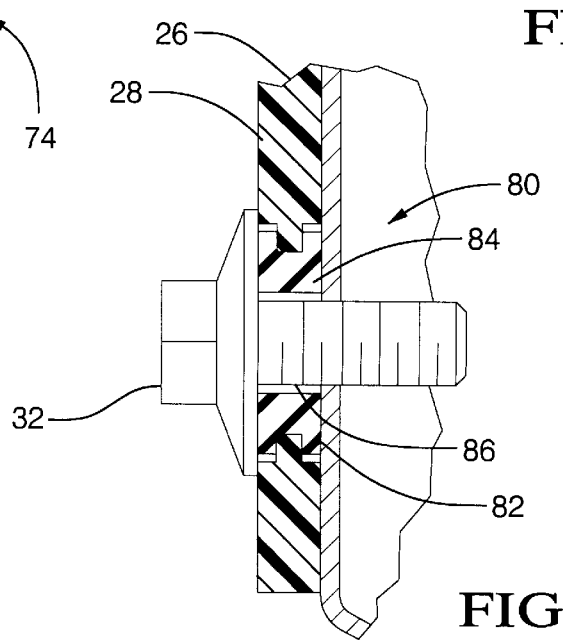
FIG. 10 is a fragmentary side view illustrating a further embodiment, according to the present invention, of the energy absorbing mechanism.

Referring to FIG. 10, a further embodiment 80, according to the present invention, of the energy absorbing mechanism 50 is illustrated. The energy absorbing air bag module 10 includes an energy absorbing insert 82 used cooperatively with a fastening mechanism, such as a fastener 32 for securing the first mounting member 24 to the instrument panel support beam 22. One type of an energy absorbing insert 82 known in the art is a grommet 84. The grommet 84 is a cylindrically shaped member having a bore 86 extending longitudinally therethrough. The grommet 84 is made from an energy absorbing material, such as rubber. It should be appreciated that the fastener 32 is inserted into the bore 86 of the grommet 84.

Advantageously, the grommet 84 absorbs energy and allows some movement of the fastener 32 and the energy absorbing air bag module 10, resulting from a contact force, as previously described. It should be appreciated by one skilled in the art that the energy absorbing air bag module 10 may utilize one or more embodiments of the energy absorbing mechanisms described herein, in optimizing the energy absorbing capability and movement of the energy absorbing air bag module 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An energy absorbing air bag module for an air bag system on a vehicle comprising:
    a housing;
    a mounting member integral with said housing for attaching said housing to a structural portion of the vehicle;
    an energy absorbing mechanism integral with said mounting member, wherein said energy absorbing mechanism deforms when a contact force strikes said energy absorbing air bag module to absorb energy and move away from the contact force; and
    wherein said mounting member includes an aperture and said energy absorbing mechanism comprises at least one breakaway bar spaced from said aperture.

2. An energy absorbing air bag module as set forth in claim 1 wherein said energy absorbing mechanism includes a plurality of breakaway bars separated by a slit extending therethrough said mounting member.

3. An energy absorbing air bag module for an air bag system on a vehicle comprising:
    a housing;
    a mounting member integral with said housing for attaching said housing to a structural portion of the vehicle;
    an energy absorbing mechanism integral with said mounting member, wherein said energy absorbing mechanism deforms when a contact force strikes said energy absorbing air bag module to absorb energy and move away from the contact force; and
    wherein said energy absorbing mechanism includes a tapered recess in said mounting member positioned adjacent an aperture in said mounting member.

4. An energy absorbing air bag module as set forth in claim 3 wherein said tapered recess has a wedge shape that is progressively narrower with a reduced cross-sectional area.

5. An energy absorbing air bag module for an air bag system on a vehicle comprising:
    a housing,
    a mounting member integral with said housing for attaching said housing to a structural portion of the vehicle;
    an energy absorbing mechanism cooperating with said mounting member, wherein said energy absorbing mechanism deforms when a contact force strikes said energy absorbing air bag module to absorb energy and move away from the contact force;
    wherein said mounting member includes an aperture and said energy absorbing mechanism comprises at least one breakaway bar spaced from said aperture; and
    wherein said energy absorbing mechanism includes an energy absorbing insert disposed within an aperture in said mounting member.

6. An energy absorbing air bag module as set forth in claim 5 wherein said energy absorbing insert is a grommet.

7. An energy absorbing air bag module for an air bag system on a vehicle comprising:
    a housing;
    a mounting member integral with said housing for attaching said housing to a structural portion of the vehicle;
    an energy absorbing mechanism integral with said mounting member, wherein said energy absorbing mechanism deforms when a contact force strikes said energy absorbing air bag module to absorb energy and move away from the contact force; and
    wherein said energy absorbing mechanism comprises a crack initiator disposed within said mounting member, wherein said mounting member includes a leg disposed within a leg receiving recess in vehicle structure of the vehicle.

8. An energy absorbing air bag module as set forth in claim 7 wherein said crack initiator comprises a notch and a thinned wall section of said mounting member.

9. An energy absorbing air bag module for an air bag system on a vehicle comprising:
    a housing;
    a mounting member integral with said housing for attaching said housing to a structural portion of the vehicle;
    an energy absorbing mechanism cooperating with said mounting member, wherein said energy absorbing mechanism deforms when a contact force strikes said energy absorbing air bag module to absorb energy and move away from the contact force;
    wherein said energy absorbing mechanism comprises a vibration damper, and said vibration damper is disposed between said mounting member and the vehicle structure; and wherein said vibration damper is a rigid foam material.

10. An energy absorbing air bag module for an air bag system on vehicle comprising:

a housing;

a mounting member integral with said housing and including an aperture extending therethrough;

a fastener to extend through said aperture for attaching said mounting member to a structural portion of the vehicle;

an energy absorbing mechanism integral with said mounting member to deform and absorb energy when a contact force strikes said housing;

wherein said mounting member comprises a first mounting member having said aperture for attachment to vehicle structure of the vehicle; and wherein said energy absorbing mechanism includes at least one breakaway bar positioned adjacent said aperture in said first mounting member.

11. An energy absorbing air bag module as set forth in claim 10 wherein said energy absorbing mechanism includes a plurality of breakaway bars separated by a slit extending through said first mounting member.

12. An energy absorbing air bag module for an air bag system on a vehicle comprising:

a housing;

a mounting member integral with said housing and including an aperture extending therethrough;

a fastener to extend through said aperture for attaching said mounting member to a structural portion of the vehicle;

an energy absorbing mechanism integral with said mounting member to deform and absorb energy when a contact force strikes said housing;

wherein said mounting member comprises a first mounting member having said aperture for attachment to the vehicle structure; and wherein said energy absorbing mechanism includes a tapered recess in said first mounting member positioned adjacent said aperture in said first mounting member.

13. An energy absorbing air bag module as set forth in claim 12 wherein said tapered recess has a wedge shape that is progressively narrower with a reduced cross-sectional area.

14. An energy absorbing air bag module for an air bag system on a vehicle comprising:

a housing;

a mounting member integral with said housing and including an aperture extending therethrough;

a fastener to extend through said aperture for attaching said mounting member to a structural portion of the vehicle;

an energy absorbing mechanism cooperating with said mounting member to deform and absorb energy when a contact force strikes said housing;

said mounting member comprising a first mounting member having said aperture for attachment to vehicle structure of the vehicle and said energy absorbing mechanism comprising at least one breakaway bar spaced from said aperture; and an energy absorbing insert disposed within said aperture in said first mounting member.

15. An energy absorbing air bag module as set forth in claim 14 wherein said energy absorbing insert is a grommet.

16. An energy absorbing air bag module for an air bag system on a vehicle comprising:

a housing;

a first mounting member integral with said housing and including an aperture extending therethrough;

a fastener to extend through said aperture for attaching said first mounting member to a structural portion of the vehicle; and an energy absorbing mechanism integral with said first mounting member to deform and absorb energy when a contact force strikes said housing; and a second mounting member having a leg, wherein said leg is disposed within a leg receiving recess in the structural portion of the vehicle.

17. An energy absorbing air bag module as set forth in claim 16 wherein said energy absorbing mechanism comprises a crack initiator disposed within said second mounting member to breakaway said second mounting member from the structural portion of the vehicle.

18. An energy absorbing air bag module as set forth in claim 17 wherein said crack initiator comprises a notch and a thinned wall section.

19. An energy absorbing air bag module for an air bag system on a vehicle comprising:

a housing;

a first mounting member integral with said housing and including an aperture extending therethrough;

a fastener to extend through said aperture for attaching said first mounting member to a structural portion of the vehicle;

an energy mechanism cooperating with said first mounting member to deform and absorb energy when a contact force said housing;

a second mounting member having a leg, wherein said disposed within a leg receiving recess in the structural portion of the vehicle; and a vibration damper disposed between said mounting member and the structural portion of the vehicle.

* * * * *